United States Patent
Fechheimer et al.

[15] 3,658,100
[45] Apr. 25, 1972

[54] BEARING MEANS FOR FILLING MACHINES AND THE LIKE

[72] Inventors: Paul R. Fechheimer, Worcester; John P. Gagliardo, Schrewsbury, both of Mass.

[73] Assignee: A-T-O Inc., Willoughby, Ohio

[22] Filed: Nov. 2, 1970

[21] Appl. No.: 85,949

[52] U.S. Cl..........................................................141/152
[51] Int. Cl.......................................B65b 43/50, B67c 3/00
[58] Field of Search.................141/144, 145, 146, 147, 177, 141/148, 149, 150, 151, 152, 369–378, 392

[56] References Cited

UNITED STATES PATENTS 2,989,092  6/1961  Whitecar..............................141/152

Primary Examiner—Houston S. Bell, Jr.
Attorney—John K. Crump

[57] ABSTRACT

A bearing for the rotatable filler head portion of a container filling machine, comprising a relatively large diameter ring-like member connected horizontally to the underside of the filler head and which is toothed along its outer periphery to coact with gear means in the base or other fixed supporting structure of the filler to power the head for rotational movement in the filler. The ring member surrounds a series of radial-type bearing devices which are supported in and around the outer of the filler base portion by means of vertically extending columns or posts and is provided with an interior circumferentially extending V-shaped groove which coacts with a like shaped outer race portion of the bearing devices to provide the filler head a highly stabilized outboard support in the base portion of the filler.

The mounting posts for the bearing devices are preferably formed eccentrically in the portion thereof which carries the devices so as to permit the devices to be individually adjusted radially with respect to the groove of the ring member to provide a desired pre-load or bearing pressure therebetween by rotating the posts about their respective axes. Also, the posts are attached into the filler base portion through means of a channel-section ring structure which forms a common seat for the lower ends of the posts and which is laterally adjustable in the base portion whereby to permit the entire head portion of the filler to be adjusted laterally in the filler for the purpose of controlling the amount of back-lash between the toothed ring member of the head and the gear means in the filler base portion.

13 Claims, 4 Drawing Figures

PATENTED APR 25 1972 3,658,100

Inventors
Paul R. Fechheimer
John P. Gagliardo
By John K. Crump
Attorney

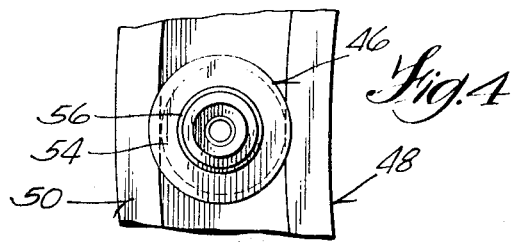
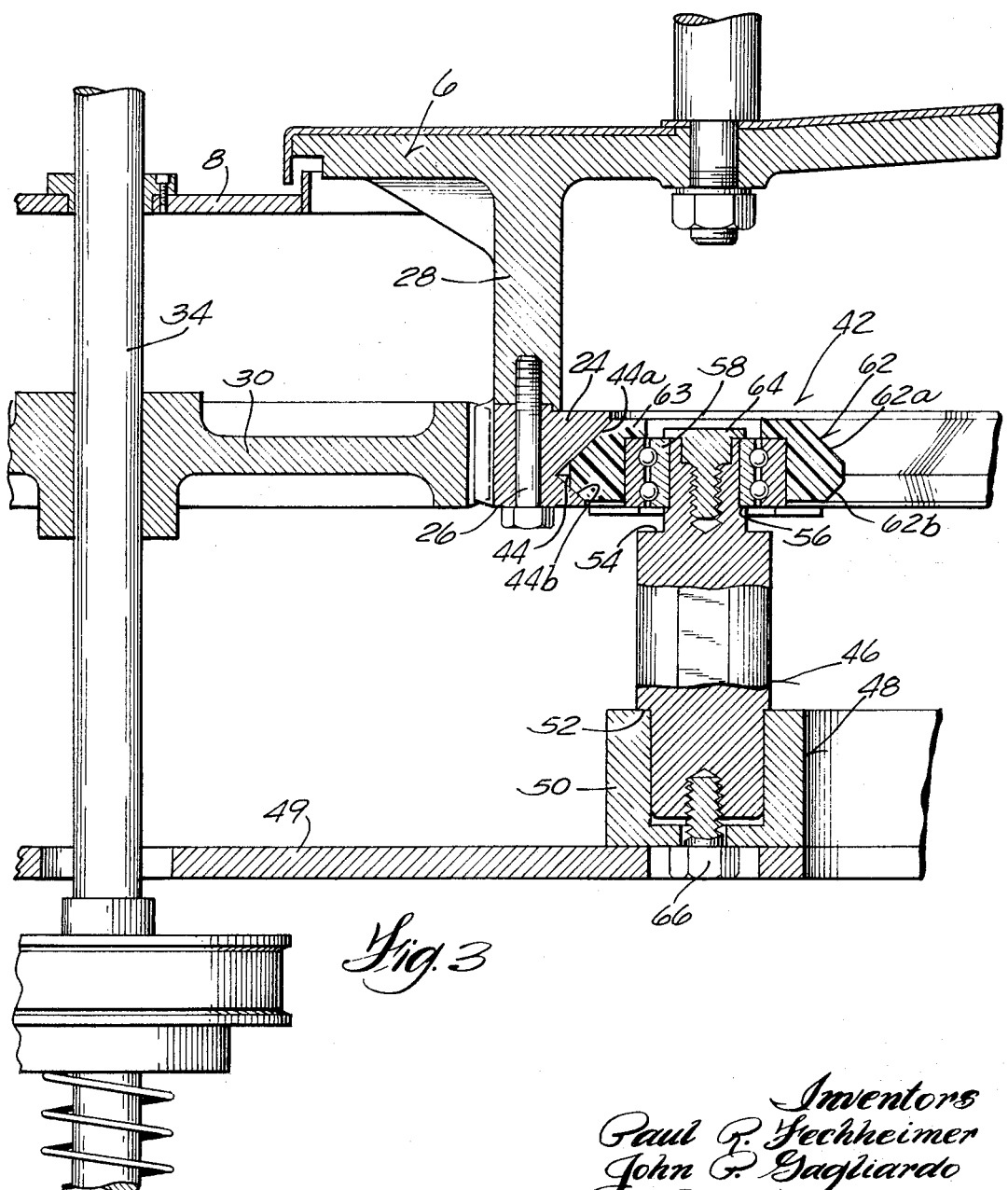

BEARING MEANS FOR FILLING MACHINES AND THE LIKE

This invention is directed to a bearing for a rotatable portion or component of a machine and more particularly is directed to a bearing wherein the rotatable portion or component of the machine which is to be supported thereby has a relatively large mass and/or size, giving rise to the development in the machine of substantial vertical thrust and/or bending loads.

The improvements of the invention while applicable to diverse types of machines and machinery having a fixed base, bed, frame or the like in rotatively supporting relation to a separate component or portion of the machine are for background purposes described herein in conjunction with a container filling machine of the type which has a fixed base portion and an upper filler head which is journaled in the base for rotation on a vertical axis through the center of the filler.

It has been proposed heretofore in the design of this type of filling machine to support the head portion of the filler in the base portion thereof through a center type of bearing, with the primary or principal bearing member being in the form of a heavy gauge shaft journaled vertically in the center of the base portion in suitable radial and thrust type bearings and fixedly attached at its upper end directly to the filler head. Among other things, such a bearing gave rise to the presence in the filler of a rather sizable moment arm for those forces arising out of centrifugal action in the rotation of the head and because of this rather severe bending loads were imposed on the shaft and its associated bearing structure. This tended to detract from the overall utility and desirability of this type of bearing arrangement in a filling machine and, in many instances, it became necessary to heavily reinforce the bearing structure and the base portion itself to sustain these loads. The trend in industry to fillers of ever increasing size and capacity has compounded the problems and inadequacies of the center-type of bearing and while various modifications have been proposed in this type of bearing to overcome the problems alluded to, for the most part these proposals have been only partially successful, resulting in many instances only in the introduction into the filler of added complexity and cost.

A further drawback of the center bearing structure as applied to a container filling machine arises from the practice in such machines of extending various of the conduits of the liquid supply system and in certain instances, of the liquid overflow or return system into the rotary head of the filler upwardly through the center of the filler base portion, with the bearing structure being made tubular in construction to permit such an arrangement. This practice while permitting these conduits to be connected to the filler head through a simple rotary or slip joint greatly complicated the maintenance and cleaning of the machine as, short of an extensive dismantling of the filler, there was no ready or convenient way for gaining access to these portions of the liquid supply and/or liquid overflow lines. This detracted from the filler both as regards its serviceability and its cleanability.

Accordingly, it may be stated that the present invention has for its principal objective the provision of a bearing for a machine such as a container filling machine which has an improved and generally simplified overall construction.

Another object of the invention is the provision in a rotary-type container filling machine of a bearing which includes interfitting bearing elements located in the head and base portions respectively of the machine in positions which are well outboard with respect to the center of the machine whereby to leave such portion of the machine unencumbered of bearing structure while at the same time affording the head a radially expanded supportive or bearing structure in the filler.

A further object of the invention is the provision in a machine such as a rotary-type container filler of a bearing for the rotary head portion thereof which includes as one element a large diameter annular or ring-like member secured to the rotary head of the machine and which functions also to drive the head for rotational movement in the filler.

A yet further objective of the present invention is the provision of a bearing which includes radially interfitting or engaging members in the filler head and base portion respectively and which are adjustable radially with respect to one another to permit varying of the pre-load or bearing pressure therebetween.

The above and other objects and advantages of the invention are essentially achieved by a bearing in which the filler head includes an interiorly grooved ring-like member attached horizontally to the underside of the filler head and wherein the filler base portion includes a series of separate bearing assemblies supported within and around the ring in radially outwardly engaging relation with the groove.

It is a feature of the invention that the outer periphery of the ring-like member is formed with gear teeth and that the ring member when in seated or engaging relation with the bearing assemblies in the filler base portion through its grooved inner periphery is at the same time in engagement along its toothed outer surface with gear means of the power train for the filler whereby to enable the ring member to function also as a drive element for the filler head. The groove of the ring member preferably is formed in the manner of a Vee to define an opposed pair of angular bearing surfaces for the bearing assemblies. The assemblies each include a conventional ball bearing unit which has been modified by the provision on the radially outer sleeve or race portion thereof of a non-metallic tire-like bearing segment, the peripheral edge of which conforms in shape and size to the groove of the ring member.

According to a further aspect of the invention, the bearing assemblies are mounted in the filler base portion on individual posts or columns which are joined together as an assembly through means of a channel-section support ring disposed in seating relation to the lower ends of the posts. The upper end portions of the mounting posts receive the bearing assemblies and are preferably provided with a slight offset to the longitudinal axis of the posts to enable the bearing assemblies to be adjusted radially to the ring-like bearing member by rotating the posts about their respective axes. This permits the pre-load pressure between the assemblies and the ring member to be adjusted to or set at a desired or preferred level. The support ring is connected into the base portion through bolt means which also extend into the respective mounting posts of the bearing assemblies whereby to also secure the posts against rotation in the support ring. The bolt means preferably are carried in the base portion in elongated slots so as to permit the entire bearing structure in the base portion, consisting of the support ring, the mounting posts and the bearing assemblies, to be shifted laterally in the base portion when the bolt means are relaxed. Such shifting movement is accompanied by a corresponding lateral shifting movement of the filler head to the base as the head derives its entire support in the filler from this shiftable bearing structure, as aforeseen. This enables a ready and convenient adjustment to be made of the relative positioning between the toothed portion of the ring-like member and the gear means which coact therewith to drive the head for rotation to enable accurate control to be maintained over the amount of back-lash in and between the gear means and the ring member.

There thus has been described an improved and simplified-type of bearing for a container filling machine or the like and which features interfitting bearing elements arranged in the filler head and base portion of the filler respectively in positions which are well outboard from the center of the filler, thereby mitigating against the development in the filler of excessively high beinding loads while at the same time imparting to the filler head a high degree of rotational stability in the filler proper. The bearing of the invention is of further advantage in that it provides for the complete elimination from the center portion of the filler of all supportive and/or bearing structure for the filler head thereby to permit the unencumbered installation in the center of the machine of liquid supply lines and/or such other lines and conduiting as may be required or desired.

The provision of an adjustment in the bearing for controlling the pre-load pressure in and between the bearing elements thereof adds to the desirability of the bearing as does the adjustment which is provided for controlling the amount of back-lash in and between the gear means of the filler power train.

Other objects and advantages of the invention will become apparent in the course of the following description of a presently preferred embodiment of the invention when taken in conjunction with the accompanying drawings illustrating such embodiment.

FIG. 3 is an enlarged showing, partly in elevation and partly in section, of one of the novel bearing assemblies of the invention as installed within the filling machine, the view being taken on a vertical plane through the machine; and FIG. 4 is a plan view on the scale of FIG. 3 of the mounting post of one of the bearing assemblies, showing the eccentric nature of its construction and the general relation of the posts to the channel-section bearing plate which seats the posts.

Figure 1:
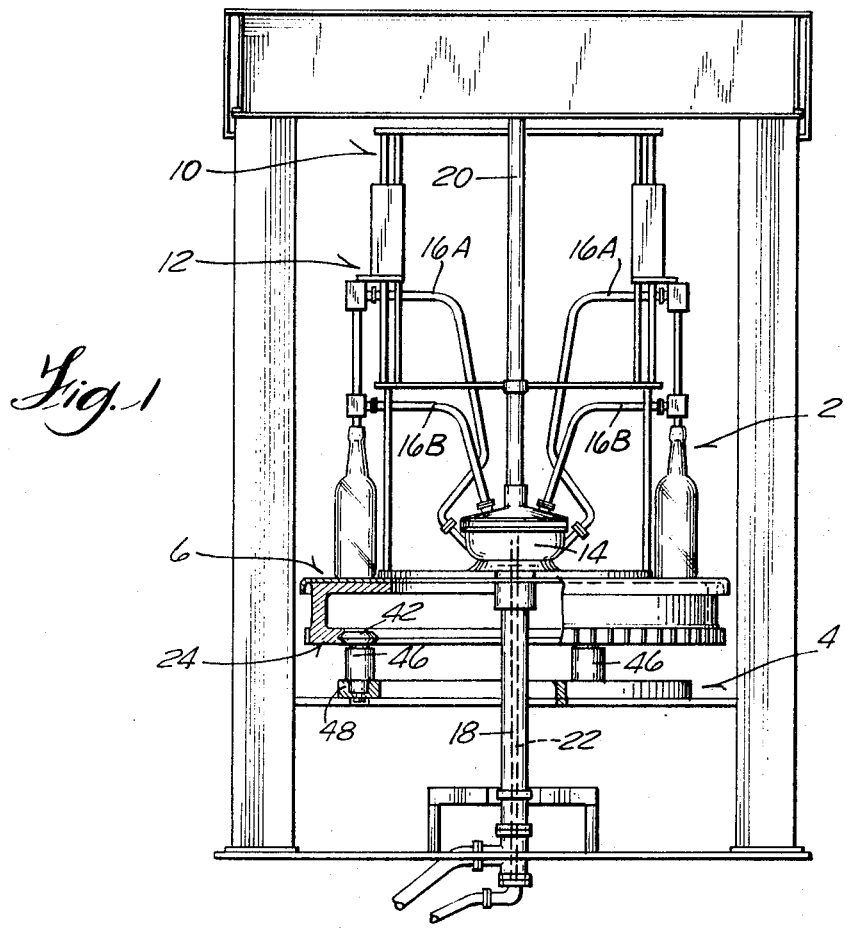
FIG. 1 is a front elevational view of a typical container filling machine incorporating the improved bearing means of the invention with parts broken away and shown in section for clarity of illustration.
Figure 2:
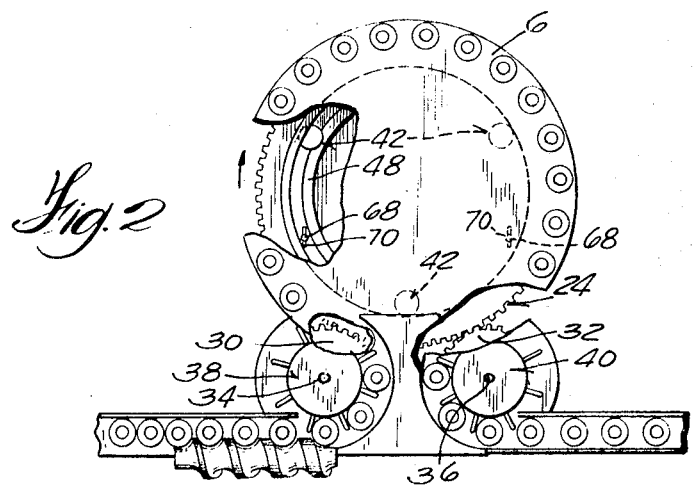
FIG. 2 is a general plan view of the portion of the filling machine which includes the rotary filler table and the container infeed and discharge mechanisms with the table being broken away and with certain parts being shown in phantom for sake of revealing details of interior construction.

The drawings, and FIG. 1 in particular, depict in general outline form a filling machine of the type used to effect the filling of containers with liquid or a semi-liquid product through vacuum, gravity or combined vacuum-gravity principles and which includes a rotatable upper head portion designated as a whole by the reference numeral 2, in combination with a fixed lower base portion which is designated by the reference numeral 4. The filler machine is for the most part of a design which is well known in the art and, for present purposes, it will suffice to note only some of the more general features of the filler head and base portion.

The filler head 2 includes a generally horizontally extending, supporting table or platform 6 for the containers which are to be processed in the filler and which is arranged generally centrally within the upper end of the base portion 4, the latter having a top plate segment 8 which defines an enlarged opening in the base for receiving the table in the manner indicated. Mounted to the table 6 is an upstanding ring or cage structure 10 which forms a support for a series of identically constructed filling spouts or nozzles 12, some only of which are shown. The spouts are located around the outer periphery of the cage structure in equi-circumferentially spaced relation to one another whereby to present a continuous succession of container filling stations to containers feeding onto the filler table as the head is rotated in the filler.

In the particular form of filler which has been selected for purposes of representing the invention, the spouts are carried in the cage structure for vertical sliding movement and it will be understood that as the head is rotated the spouts move in a preestablished manner relatively between raised, inoperative positions in the cage structure and lowered or filling positions therein to effect the filling of the containers. This movement of the spouts is effected through the coaction of a conventional fixed cam means in the filler with a corresponding cam follower carried by the nozzles.

Each of the nozzles is connected with a supply manifold 14 in the center of the filler table 6 by a pair of flexible conduits 16a, 16b. The conduits 16a serve to deliver liquid to the nozzles from a liquid supply chamber in the manifold and which chamber as more fully described in co-pending patent application Ser. No. 85,442, filed Oct. 30, 1970 (which has a common assignee with that of the instant invention) is connected through a slip-joint to the upper end portion of a liquid inlet conduit 18 located vertically in the center of the filler base portion. The other conduit of each pair, namely conduit 16b, is connected to a separate vacuum chamber in the manifold and which, in turn, is connected through another slip-joint to a vacuum supply line 20 arranged vertically above the manifold in the center of the filler. Although not shown, the vacuum chamber of the manifold connects to a liquid overflow line 22 mounted in the center of the liquid supply conduit 18 to enable any liquid drawn out of the containers at the termination of the filling cycle to pass out through the bottom of the manifold rather than being drawn into the vacuum line 20.

With regard now to the details of filler construction at the interface of the filler head with the base portion, it is to be initially noted that a relatively large diameter ring gear 24 is affixed as by bolt means 26 to a depending rib 28 formed integrally on the underside of the filler table 6. The ring gear forms a part of the power train of the filler and with the head in assembled relation to the filler base, is engaged along its toothed outer surface with a pair of spur gears 30 and 32 which are mounted in the base portion on the respective vertical shafts 34 and 36. These gears are coupled through their respective shafts with multiple-spoked container handling wheels 38 and 40 which serve to feed the bottles or other containers being processed in the filler into the filling head 2 with the proper spacing and timing and to discharge the bottles from the head when filling is completed. In the illustrated construction, the gear 30 is shown to be coupled through shaft 34 to the wheel 38 and the latter is positioned at the infeed side of the filling head to effect container feed thereto. The gear 32 is accordingly coupled through its shaft 36 to the wheel 40 with the latter serving to effect the withdrawal of the containers from the filling head. While not shown, it will be understood that one of the gears 30, 32 is further coupled through its respective mounting shaft directly to the power source of the filler so that in filler operation the filling head and the container handling wheels 38 and 40 will all be rotated in synchronized relationship with one another.

The arrangement and construction described above for the ring gear are in general conformity with the design practice normally followed in machines of the instant type and there is no particular novelty in the gear as described to this point. However, in the invention, the ring gear in addition to serving as a driver for the filler head serves further as a part of an improved bearing means for supporting the filler head in the base structure in a way as avoids the limitations and drawbacks of the center-type of bearing which is normally employed in filling machines of the general nature described.

More particularly, in accordance with the essence of the invention, the ring gear forms an outer, circular bearing race for a series of radial-type bearing devices 42 which are located in and around the center of the filler base portion and is for this purpose provided with a continuous groove along its inner peripheral surface, as indicated at 44. In the illustrated and preferred construction of the ring, this groove has a substantial radial projection in the ring gear with the gear itself either being enlarged substantially in radial and axial sectional thickness to permit this or being provided with a separate inner liner of the requisite cross-sectional area. In either event, it is preferred that the groove be provided with a generally fragmented or incompleted V-like configuration with the apex disposed in a radially outer position in the ring and with the legs or branches thereof, identified at 44a and 44b respectively, being of an unequal length and extending radially inwardly of the ring in opposite angled relation to a horizontal plane through the apex.

The bearing devices 42 are formed as a part of a separate assembly in the base portion and which includes a mounting post or column 46 for each of the devices 42 and an annular channel-section plate member 48 for seating the posts in the base portion. The posts 46 extend vertically from the plate 48 which, as shown, is carried on the intermediate plate 34 of the base portion with the channel forming side walls or flanges 50 of the plate extending or facing upwardly within the base. The support posts or columns are of a principal thickness or transverse dimension which is in excess of the inside width of the plate member and, in order to be received therein, the posts are provided with a radially reduced or inwardly stepped construction along their respective lower end portions to provide an abutment indicated at 52. This abutment is located axially of the posts such that the posts when assembled in the plate 48 engage or bear along the edges of the side walls 50 with the lower end of the posts being spaced just above the web portion of the plate, the reason for which construction will appear hereinafter. The posts are located around the plate in equispaced relation to one another and inasmuch as the particular embodiment of the invention shown herein has a total of three separate bearing devices 42 the posts will therefore be positioned around the plate in 120° spaced apart relation to one another.

The bearing devices are carried on the upper end portions of the posts and which are shown as residing radially inwardly of the ring gear in the same horizontal plane therewith and as being stepped progressively inwardly in an upward proceeding direction along the posts as indicated at 54 and again at 56. The devices are formed identically of a conventional ball bearing unit 58 having a press fitting engagement with the portion of the posts above the uppermost of the steps or shoulders, viz, shoulder 58 and an annular tire-like member 62 disposed in circumscribing relation to the unit 58 and bonded or otherwise intimately secured to the outer sleeve or race portion thereof to rotate as a unit therewith relatively of the inner sleeve or race portion of the ball bearing unit. The member 62 is adapted to seat in the groove of the ring gear whereby to support the filler head in the base portion of the filler and is formed over its outer edge portion with a contour which is substantially fully complementary to that of the groove so as to mate fully with the bearing surfaces 44a and 44b of the ring gear when the devices are assembled properly in the base portion. It can be appreciated that because of the angularity of the groove faces 44a and 44b and the corresponding faces or surfaces 62a and 62b of the member 62 the gear ring and each of the separate bearing devices tend to be forced tightly together by the loads imposed thereon through the filler head. This, when taken together with the substantial increase which attains in the radial span over which the filler head is supported by reason of the outboard disposition in the filler of these bearing devices, results in a bearing which is capable of affording the head an extremely high degree of vertical and horizontal stability in the filler base portion. This angularity is further desirable in that it results in the bearing devices engaging or seating within the groove of the ring gear through a wedging action, thereby obviating the necessity of forming the groove and the tire member 62 to within extremely close tolerances of one another to assure a positive, tight fit therebetween. This is desirable from a cost standpoint. It is to be further noted that the provision of an increased length in the upper bearing portions 44a and 60a of the ring gear 44 and tire member 60 respectively renders the bearing more effective in taking up vertical thrust and bending loads from the filler head as it results in a greater proportion of the total area of contact between the ring gear and bearing devices being available in the vertically upper plane of the bearing.

The member 62 is preferably formed of a non-metallic material whereby to reduce friction and wear in and between the ring gear and the bearing devices. A particularly advantageous material of construction for the tire member has been found to be a phenolic resin which has a fabric reinforcing. It is preferred too, for ease and accuracy of assembly, that the tire member be formed in the end thereof which is uppermost in the assembled position of the device with a retainer lip 62 for seating the ball bearing unit 58. The unit itself has a press fit with the post as aforesaid with its lower end seating against the shoulder 56. A stud 64 threads axially into the upper end of the posts to secure the ball bearing unit and the bearing devices themselves against upward movement on the posts. This lip acts also to seal the upper face of the ball bearing unit to the entry of dust, dirt, grease and the like.

In accordance with a further particularly novel aspect of the bearing structure of the invention, the upper end portions of the posts 46 are formed with a slight amount of longitudinal offset relatively of the lower portions thereof so as to in effect provide the bearing devices 42 with an eccentric mounting in the base portion. This eccentricity enables the bearing devices to be adjusted radially with respect to the groove of the ring gear simply by varying the relative rotational position in the plate 48 of the corresponding post whereby to provide a ready means for initially establishing and thereafter maintaining the individual bearing devices uniformly and accurately positioned with respect to the groove. This adjustment is further desirable in that it permits for any particular filler the pre-load pressure in and between the individual bearing devices 42 and the grooved portion of the ring gear to be readily established and thereafter maintained within the particular range or at the particular value which has been found to provide optimum efficiency and smoothness of operation in such filler. The posts are secured against rotation in the plate structure 48 whereby to maintain the bearing devices with which they are associated in a fixed radial position to the groove 44 through bolt means 66 fitting vertically upwardly through the intermediate plate 49 of the base portion and extending axially into the lower end of the posts through the plate 48. The posts may be provided with one or more pairs of diametrically located flats so as to permit the application thereto of a wrench when it is desired to rotate the posts in the plate to adjust the bearing devices with respect to the ring gear 24. This turning of the posts in the plate 48 is facilitated by the aforesaid arrangement between the lower end portions of the posts 46 and the plate and which results in the posts seating against the plate flanges 50 rather than against the web portion of the plate, thereby working a reduction in the bearing area between the posts and plate.

The channel-section plate member 48 is secured to the plate 49 of the base portion by bolt means 68 and as a further feature of the invention it is proposed that the bolts be carried in the intermediate plate of the base portion within generally radially elongate slots 70 so as to permit the plate 48 along with the posts 46 and the associated bearing devices 42 to be adjusted laterally in the base portion when the bolts are relaxed. Inasmuch as the filler head is supported in the filler entirely through these members any such adjustment will result in a corresponding adjustment or movement of the ring gear relatively of the spur gears 30 and 32. This adjustment enables the gears to be established in the filler with a desired or controlled amount of play or back-lash therebetween and permits the gears to be adjusted in the field as may be needed to take-up for wear or the like. It is to be noted that this adjustment can be made without disturbing the radial positioning of the bearing assemblies 42 relatively of the groove 44 of ring gear 24 as the bolt means 66 remain tight between the plate 48 and the mounting posts 46. Some clearance must be provided, however, in the plate 49 for the bolt means 66 to permit this shifting movement of the plate in the base portion.

There thus has been described a bearing which as applied to the rotary head of a container filling machine substantially reduces the unsupported span in the filler of the filler head, thereby not only imparting an increased vertical and horizontal stability to the head but also providing a substantial reduction in the magnitude of the bending loads arising during filling machine operation. The bearing is of further particular advantage in that it combines a bearing function in the gear mechanism which is used to power the head for rotation to thus simplify the overall construction of the filler by reducing the number of parts and/or assemblies needed to perform these functions.

The novel adjustments which are built-in to the bearing structure of the invention provide for the rapid and accurate set-up in the field of the filler while at the same time permitting the convenient performance in the field of such re-adjustments as may be needed in and between the interfitting elements of the bearing and in the separate gears of the filler power train due to wear or shifting of parts during filler operation.

While described specifically in conjunction with a container filling machine, the improvements of the invention may be applied to a wide range of machines, apparatus and equipment or parts thereof wherein it is required or desired to support one component or assembly of the machine or the like for rotational movement relatively of another portion thereof and it will be understood therefore that the aforegoing description is primarily by way of setting forth a presently preferred embodiment of the invention rather than by way of limiting the scope of the invention.

Various means of carrying out the present invention are contemplated as being within the scope of the following claims which particularly point out and distinctly claim the subject-matter regarded as the nature of the present invention.

I claim:

1. A bearing unit for a rotatable component of a machine or the like and which includes a fixed base for supporting such rotatable component, comprising a large diameter ring member secured horizontally to the underside of the rotatable component of the machine, said ring member being provided along its inner peripheral surface with a continuous groove, a series of individual radial bearing devices having an inner bearing race portion in journaled support of an outer bearing race portion which is formed substantially complementary in outer edge trace to the groove of said ring member, and means for supporting said devices in and around the center of the base portion of the machine with the outer race portion of the devices engaged radially outwardly within the groove of said ring member.

2. The construction of claim 1 wherein the groove of said ring member and the outer bearing race portion of said radial bearing devices have first and second engaging surfaces which are oppositely, angularly inclined to a horizontal plane containing the ring member.

3. The construction of claim 2 wherein the means for supporting said devices in and around the center of the base portion of the machine includes an eccentrically formed, vertically extending mounting post for each of the devices and wherein the bearing devices are mounted co-axially to the posts on the eccentric portion thereof whereby to permit said devices to be adjusted radially of the ring member through said posts.

4. In a filling machine of the type having a filling head supported in a fixed base portion for rotary movement about a vertical axis through the center of the machine and which further includes a gear means in the base portion of the machine for driving the head for rotation, a combined gear and bearing structure for the filling head, comprising the combination of a relatively large diameter ring secured horizontally to the underside of the filling head with a series of individual radial bearing assemblies journably supported in and around the center of the base portion and extending upwardly to within the ring, said ring formed along its outer periphery with gear teeth and disposed in meshing engagement through said teeth with the gear means in said base portion and further formed along its inner periphery with a continuous circumferential groove to define a bearing race for said radial bearing assemblies, said bearing assemblies each including an outer rotatable member conforming in edge contour to the groove of said ring and seating therein to form a bearing for the head.

5. The construction of claim 4 wherein the groove of the ring and the edge of the outer rotatable member of the bearing assemblies are generally V-shaped whereby to provide a wedging action between the ring and the bearing assemblies when the latter are seated in the groove of said ring.

6. The construction of claim 4 wherein the radial bearing assemblies are supported in the base portion of the filler as a separate laterally adjustable assembly whereby to permit the ring of the filler head to be adjusted relatively of the gear means in said base portion to control the amount of back-lash between the toothed portion of said ring and said gear means.

7. The construction of claim 4 wherein the bearing assemblies are supported in the base portion of the filler through structure which includes an eccentrically formed mounting post for each such assembly, said posts secured vertically in the base portion by means permitting adjustment of the rotational position of the individual posts whereby to effect a corresponding individual radial adjustment of the bearing assemblies to the groove of said ring.

8. In a filling machine of the type having a filling head supported in a fixed base portion for rotary movement about a vertical axis through the center of the machine and which further includes a gear in the base portion for driving the head for rotation, a combined gear and bearing structure for the filling head which comprises a relatively large diameter ring member secured horizontally to the underside of the filling head in combination with a series of three or more radial-type bearing assemblies journably supported in and around the said base portion and extending upwardly therefrom to within said ring member, said ring member formed with gear teeth along its outer periphery and disposed in meshing engagement through such teeth with the gear means in said base portion, said ring member further formed along its inner periphery with a relatively deep circumferentially extending groove to define a bearing race for said bearing assemblies, said bearing assemblies each including a non-metallic, radially outer bearing member fitting within the groove of said ring member and conforming in edge contour to said groove.

9. The construction of claim 8 wherein the groove of the ring member and each of the outer bearing members of said bearing assemblies have oppositely angularly extending, radial bearing faces whereby to effect a wedging action between said ring member and the bearing assemblies when the latter are seated within the groove of said ring member.

10. In a filling machine of the type having a filling head supported in a fixed base portion for rotary movement about a vertical axis through the center of the machine and which further includes a gear means in the base portion for driving the head for rotation, a bearing for the filler head comprising the combination of a relatively large diameter ring-like member secured horizontally to the underside of the filling head with a series of radial bearing devices journaled in and around the center of the base portion of the machine in supportive relation to the ring-like member, said ring-like member lying between and in a horizontal plane which contains said gear means and said radial bearing devices and being grooved along its inner peripheral surface to seat said radial bearing devices and being formed along its outer peripheral surface with gear teeth to drivingly couple the head to said gear means.

11. A bearing unit for a machine of the type which has a rotary portion and a fixed portion in support thereof, comprising a ring secured horizontally to one of the rotary or fixed portions of the machine generally along the interface between said rotary and fixed portions, said ring provided along its radially inner surface with a relatively deep, V-shaped groove, and a series of radial-type bearing devices supported in the other of the rotary and fixed portions of the machine interiorly of the ring and having a V-shaped outer bearing member engaging radially outwardly within the groove of said ring.

12. In a machine of the type having a fixed base portion and a rotatable upper head portion, a combined bearing and drive means for such head portion comprising a large diameter ring member secured horizontally to the head portion and formed along its outer peripheral surface with a continuous series of gear teeth and along its inner peripheral surface with a continuous groove, a driven gear means mounted in the base portion of the machine in engaged relation with the outer periphery of said ring member and a series of individual radial bearing devices journaled in the base portion of the machine and extending upwardly to within the ring member of said head portion, said bearing devices located at predetermined different positions to one another around a pitch circle whose center is on the rotational axis in the machine or the head portion thereof and with each such device having an outer rotatable bearing member engaging outwardly within the groove of said ring member.

13. The construction of claim 12 wherein the radial bearing devices are journaled in the base portion of the machine by structure which comprises a vertically extending mounting post for each such device and an annular plate disposed in seated relationship to the lower ends of the posts and connected to the posts and to the base portion itself by bolt means, said bolt means being carried in the base portion in horizontally elongate slots whereby to permit said mounting posts and bearing devices to be shifted horizontally in the base portion as an assembly with said plate for adjusting the relative positioning between and the amount of play in the gear teeth of said ring member and said gear means in the base portion of the machine.

* * * * *